US010235466B2

(12) United States Patent
Brunn et al.

(10) Patent No.: US 10,235,466 B2
(45) Date of Patent: Mar. 19, 2019

(54) PROFILE DRIVEN PRESENTATION CONTENT DISPLAYING AND FILTERING

(71) Applicant: International Business Machines Corporation, Armonk, NY (US)

(72) Inventors: Jonathan F. Brunn, Logan, UT (US); Jennifer Heins, Cary, NC (US); Marc D. Labrecque, Durham, NC (US); Erika Varga, Harvard, MA (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 14/749,039

(22) Filed: Jun. 24, 2015

(65) Prior Publication Data
US 2016/0378870 A1    Dec. 29, 2016

(51) Int. Cl.
G06F 17/30 (2006.01)
H04L 29/08 (2006.01)

(52) U.S. Cl.
CPC .. G06F 17/30867 (2013.01); G06F 17/30029 (2013.01); G06F 17/30056 (2013.01); G06F 17/30424 (2013.01); H04L 67/306 (2013.01)

(58) Field of Classification Search
CPC ......... G06F 17/30761; G06F 17/30053; G06F 17/3064; G06F 17/30017; G06F 17/30722; G06F 17/30106; G06F 17/3082; G06F 17/30867; G06F 17/30424; G06F 17/30828; G06F 17/30817; G06F 17/3053; G06F 17/30554; G06F 17/30973
See application file for complete search history.

(56) References Cited

U.S. PATENT DOCUMENTS

| 6,535,639 B1* | 3/2003 | Uchihachi | G06F 17/30799 707/999.003 |
| 8,060,906 B2* | 11/2011 | Begeja | G06F 17/30017 725/13 |
| 9,338,047 B1* | 5/2016 | Kunal | G06Q 30/0201 |
| 9,491,601 B2* | 11/2016 | Bauer | H04W 4/16 |
| 9,953,377 B2* | 4/2018 | Lymberopoulos | G06F 17/30761 |
| 2005/0166156 A1 | 7/2005 | Frigon et al. | |
| 2006/0161635 A1* | 7/2006 | Lamkin | G06F 17/30041 707/E17.009 |

(Continued)

FOREIGN PATENT DOCUMENTS

WO    WO 2007/001639 A2    1/2007
WO    WO 2009/037282 A2    3/2009

OTHER PUBLICATIONS

Shot transition detection, https://en.wikipedia.org/wiki/Shot_transition_detection Printed on: Jun. 16, 2015, 5 pages.

(Continued)

Primary Examiner — Jeff A Burke
Assistant Examiner — Rezwanul Mahmood
(74) Attorney, Agent, or Firm — Scully, Scott, Murphy & Presser, P.C.; L. Jeffrey Kelly, Esq.

(57) ABSTRACT

The present disclosure provides for automatically detecting groups of people who may be interested in different types of content (e.g., different presentations, different presentation sections, different presentation styles). Further, the present disclosure provides for automatically providing presentation filters appropriate for each group of people.

20 Claims, 5 Drawing Sheets

(56) References Cited

U.S. PATENT DOCUMENTS

| | | | |
|---|---|---|---|
| 2008/0177994 A1* | 7/2008 | Mayer | G06F 9/4418 707/999.004 |
| 2009/0063252 A1* | 3/2009 | Abhyanker | G06Q 30/02 705/7.32 |
| 2009/0276419 A1* | 11/2009 | Jones | G06F 17/30637 707/999.005 |
| 2009/0307168 A1* | 12/2009 | Bockius | G06F 17/30867 707/999.104 |
| 2010/0031162 A1* | 2/2010 | Wiser | G06Q 30/0255 705/14.53 |
| 2010/0050202 A1* | 2/2010 | Kandekar | G06F 17/30244 715/716 |
| 2011/0113041 A1* | 5/2011 | Hawthorne | G06F 17/30905 707/749 |
| 2011/0138411 A1* | 6/2011 | Koontz, III | H04H 20/18 725/32 |
| 2011/0208418 A1* | 8/2011 | Looney | G06Q 20/10 705/39 |
| 2011/0282954 A1 | 11/2011 | Flake et al. | |
| 2012/0323938 A1* | 12/2012 | Skeen | G06F 17/30752 707/754 |
| 2013/0031162 A1* | 1/2013 | Willis | H04L 65/1069 709/203 |
| 2013/0151352 A1* | 6/2013 | Tsai | G06Q 30/0641 705/14.73 |
| 2013/0326406 A1 | 12/2013 | Reiley et al. | |
| 2014/0081965 A1* | 3/2014 | Gross | G06F 17/30699 707/732 |
| 2014/0100927 A1 | 4/2014 | Bhogal et al. | |
| 2014/0200963 A1* | 7/2014 | Abhyanker | G06Q 30/0205 705/7.34 |
| 2014/0278973 A1* | 9/2014 | Lowe | G06Q 30/0255 705/14.53 |
| 2014/0364097 A1* | 12/2014 | Bauer | H04W 4/16 455/414.3 |
| 2015/0071601 A1* | 3/2015 | Dabous | G06Q 30/02 386/230 |
| 2015/0089524 A1* | 3/2015 | Cremonesi | H04N 21/252 725/14 |
| 2016/0001184 A1* | 1/2016 | Sepulveda | A63F 13/803 463/31 |
| 2016/0001187 A1* | 1/2016 | Sepulveda | A63F 13/77 463/31 |
| 2016/0041998 A1* | 2/2016 | Hall | G06F 17/30106 707/725 |
| 2016/0057500 A1* | 2/2016 | Berson | H04L 63/102 715/716 |
| 2016/0063087 A1* | 3/2016 | Berson | G06Q 30/0259 707/740 |
| 2016/0162591 A1 | 6/2016 | Dokania et al. | |
| 2016/0378870 A1* | 12/2016 | Brunn | G06F 17/30867 707/732 |

OTHER PUBLICATIONS

Video content analysis, https://en.wikipedia.org/wiki/Video_content_analysis Printed on: Jun. 24, 2015, 4 pages.

\* cited by examiner

| | A | B | C | D | E | F | G | H | |
|---|---|---|---|---|---|---|---|---|---|
| Contributor | ✓ | ✓ | ✓ | ✓ | ✓ | ✓ | ✓ | ✓ | Role, owner, editor |
| Executives | ✓ | ✓ | ✓ | ✗ | ✓ | ✓ | ✗ | ✗ | Org structure, job title, logs |
| External | ✓ | ✓ | ✗ | ✗ | ✓ | ✗ | ✗ | ✗ | Org structure, network, tags |

FIG. 1

PROFILE DRIVEN PRESENTATION CONTENT DISPLAYING AND FILTERING

BACKGROUND

The present disclosure relates generally to the field of profile driven presentation content displaying and filtering. In various embodiments, systems, methods and computer program products are provided.

Typically, a person may create a computer presentation (e.g., a set of computer slides, a word processing document, a spreadsheet, or an audio/video presentation) including both high level summary information and technical details. The computer presentation, such as in the form of a computer file, may be utilized by both the creator and, for example, a technical team. Such a technical team (which may include appropriate managers) may need to see all of the technical details and less of the high level summary information. On the other hand, the computer file with the presentation may also be provided to one or more executives, who do not have a need to see the lower level details but want to see the high level summary.

With respect to the above scenario, the use of conventional mechanisms often results in maintaining two or more versions of a file so that the level of detail included therein can be controlled. However, maintaining multiple versions of the presentation file has certain disadvantages.

For example, a number of different users may find the two versions of the presentation file. But various users find the version that had been intended for another audience. That is, the executives, looking at the version of the presentation including the technical details, dismiss the project as too technical. Further, the managers create their workforce size for the project based on the high level summary information which doesn't include the technical details. Moreover, the engineering team creates a new wiki and starts thinking of solutions to the problems that had already been covered in the version of the presentation including the technical details.

Even with certain conventional mechanisms, such as SLIDERIVER, each combination of slides essentially becomes a separate presentation. Thus, while SLIDERIVER addresses problems with duplicated slides or updates to slides across presentations, SLIDERIVER does not directly address the problem mentioned above.

Further, there are existing mechanisms for showing expansions of video timelines. For example, for a long video in YOUTUBE a user may see something when hovering on the timeline where a grey box above the timeline shows a zoomed view of the area around the point being hovered on the timeline.

SUMMARY

The present disclosure provides for automatically detecting groups of people who may be interested in different types of content (e.g., different presentations, different presentation sections, different presentation styles). Further, the present disclosure provides for automatically providing presentation filters appropriate for each group of people.

In one embodiment, a computer-implemented method for displaying and filtering a content of a presentation is provided, the method comprising: receiving, by a processor, data associated with a plurality of users, wherein the data comprises: (a) content previously remarked on by the plurality of users; and (b) the remarks previously made by the plurality of users; performing, by the processor, a user profile analysis based on the received data, wherein the user profile analysis provides: (a) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and (b) a second user profile group identifying a second group of users, wherein the second group of users comprises a subset of the plurality of users and wherein the remarks made by any user in the second group of users is more predictive of remarks from other users in the second group of users than remarks from a random user from the plurality of users; performing, by the processor, a first content characteristic analysis based on the received data, the first user profile and the second user profile, wherein the first content characteristic analysis provides: (a) for the first user profile a first content profile including at least one characteristic of the content previously remarked on by the plurality of users that would be predictive of positive remarks by the first group of users; and (b) for the second user profile a second content profile including at least one characteristic of the content previously remarked on by the plurality of users that would be predictive of positive remarks by the second group of users; receiving, by the processor, the presentation containing the content to be displayed and filtered; performing, by the processor, a second content characteristic analysis based on the content to be displayed and filtered, the first user profile, the second user profile, the first content profile and the second content profile, wherein the second content characteristic analysis provides: (a) for the first user profile, and for a first section of the content to be displayed and filtered, a first score indicative of a likelihood that the first group of users would remark positively on the first section of the content; (b) for the first user profile, and for a second section of the content to be displayed and filtered, a second score indicative of a likelihood that the first group of users would remark positively on the second section of the content; (c) for the second user profile, and for the first section of the content to be displayed and filtered, a third score indicative of a likelihood that the second group of users would remark positively on the first section of the content; and (d) for the second user profile, and for the second section of the content to be displayed and filtered, a fourth score indicative of a likelihood that the second group of users would remark positively on the second section of the content; providing, by the processor, a first presentation filter for the first group of users that is based upon the first and second scores, that defines whether to show the first section of content and that defines whether to show the second section of content; and providing, by the processor, a second presentation filter for the second group of users that is based upon the third and fourth scores, that defines whether to show the first section of content and that defines whether to show the second section of content.

In another embodiment, a computer readable storage medium, tangibly embodying a program of instructions executable by the computer for displaying and filtering a content of a presentation is provided, the program of instructions, when executing, performing the following steps: receiving data associated with a plurality of users, wherein the data comprises: (a) content previously remarked on by the plurality of users; and (b) the remarks previously made by the plurality of users; performing a user profile analysis based on the received data, wherein the user profile analysis provides: (a) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and (b) a second user profile group identifying a second group of users, wherein the second group of users comprises a subset of the plurality of users and wherein the remarks made by any user in the second group of users is more predictive of remarks from other users in the second group of users than remarks from a random user from the plurality of users; performing a first content characteristic analysis based on the received data, the first user profile and the second user profile, wherein the first content characteristic analysis provides: (a) for the first user profile a first content profile including at least one characteristic of the content previously remarked on by the plurality of users that would be predictive of positive remarks by the first group of users; and (b) for the second user profile a second content profile including at least one characteristic of the content previously remarked on by the plurality of users that would be predictive of positive remarks by the second group of users; receiving the presentation containing the content to be displayed and filtered; performing a second content characteristic analysis based on the content to be displayed and filtered, the first user profile, the second user profile, the first content profile and the second content profile, wherein the second content characteristic analysis provides: (a) for the first user profile, and for a first section of the content to be displayed and filtered, a first score indicative of a likelihood that the first group of users would remark positively on the first section of the content; (b) for the first user profile, and for a second section of the content to be displayed and filtered, a second score indicative of a likelihood that the first group of users would remark positively on the second section of the content; (c) for the second user profile, and for the first section of the content to be displayed and filtered, a third score indicative of a likelihood that the second group of users would remark positively on the first section of the content; and (d) for the second user profile, and for the second section of the content to be displayed and filtered, a fourth score indicative of a likelihood that the second group of users would remark positively on the second section of the content; providing a first presentation filter for the first group of users that is based upon the first and second scores, that defines whether to show the first section of content and that defines whether to show the second section of content; and providing a second presentation filter for the second group of users that is based upon the third and fourth scores, that defines whether to show the first section of content and that defines whether to show the second section of content.

In another embodiment, a computer-implemented system for displaying and filtering a content of a presentation is provided, the system comprising: a processor; and a memory storing computer readable instructions that, when executed by the processor, implement: a first receiving element configured to receive data associated with a plurality of users, wherein the data comprises: (a) content previously remarked on by the plurality of users; and (b) the remarks previously made by the plurality of users; a first performing element configured to perform a user profile analysis based on the received data, wherein the user profile analysis provides: (a) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and (b) a second user profile group identifying a second group of users, wherein the second group of users comprises a subset of the plurality of users and wherein the remarks made by any user in the second group of users is more predictive of remarks from other users in the second group of users than remarks from a random user from the plurality of users; a second performing element configured to perform a first content characteristic analysis based on the received data, the first user profile and the second user profile, wherein the first content characteristic analysis provides: (a) for the first user profile a first content profile including at least one characteristic of the content previously remarked on by the plurality of users that would be predictive of positive remarks by the first group of users; and (b) for the second user profile a second content profile including at least one characteristic of the content previously remarked on by the plurality of users that would be predictive of positive remarks by the second group of users; a second receiving element configured to receive the presentation containing the content to be displayed and filtered; a third performing element configured to perform a second content characteristic analysis based on the content to be displayed and filtered, the first user profile, the second user profile, the first content profile and the second content profile, wherein the second content characteristic analysis provides: (a) for the first user profile, and for a first section of the content to be displayed and filtered, a first score indicative of a likelihood that the first group of users would remark positively on the first section of the content; (b) for the first user profile, and for a second section of the content to be displayed and filtered, a second score indicative of a likelihood that the first group of users would remark positively on the second section of the content; (c) for the second user profile, and for the first section of the content to be displayed and filtered, a third score indicative of a likelihood that the second group of users would remark positively on the first section of the content; and (d) for the second user profile, and for the second section of the content to be displayed and filtered, a fourth score indicative of a likelihood that the second group of users would remark positively on the second section of the content; a first providing element configured to provide a first presentation filter for the first group of users that is based upon the first and second scores, that defines whether to show the first section of content and that defines whether to show the second section of content; and a second providing element configured to provide a second presentation filter for the second group of users that is based upon the third and fourth scores, that defines whether to show the first section of content and that defines whether to show the second section of content.

BRIEF DESCRIPTION OF THE DRAWINGS

Various objects, features and advantages of the present invention will become apparent to one skilled in the art, in view of the following detailed description taken in combination with the attached drawings, in which:

FIG. 1 depicts a diagram showing various sections of a presentation being filtered for display to a number of types of users according to an embodiment.

DETAILED DESCRIPTION

Figure 2:
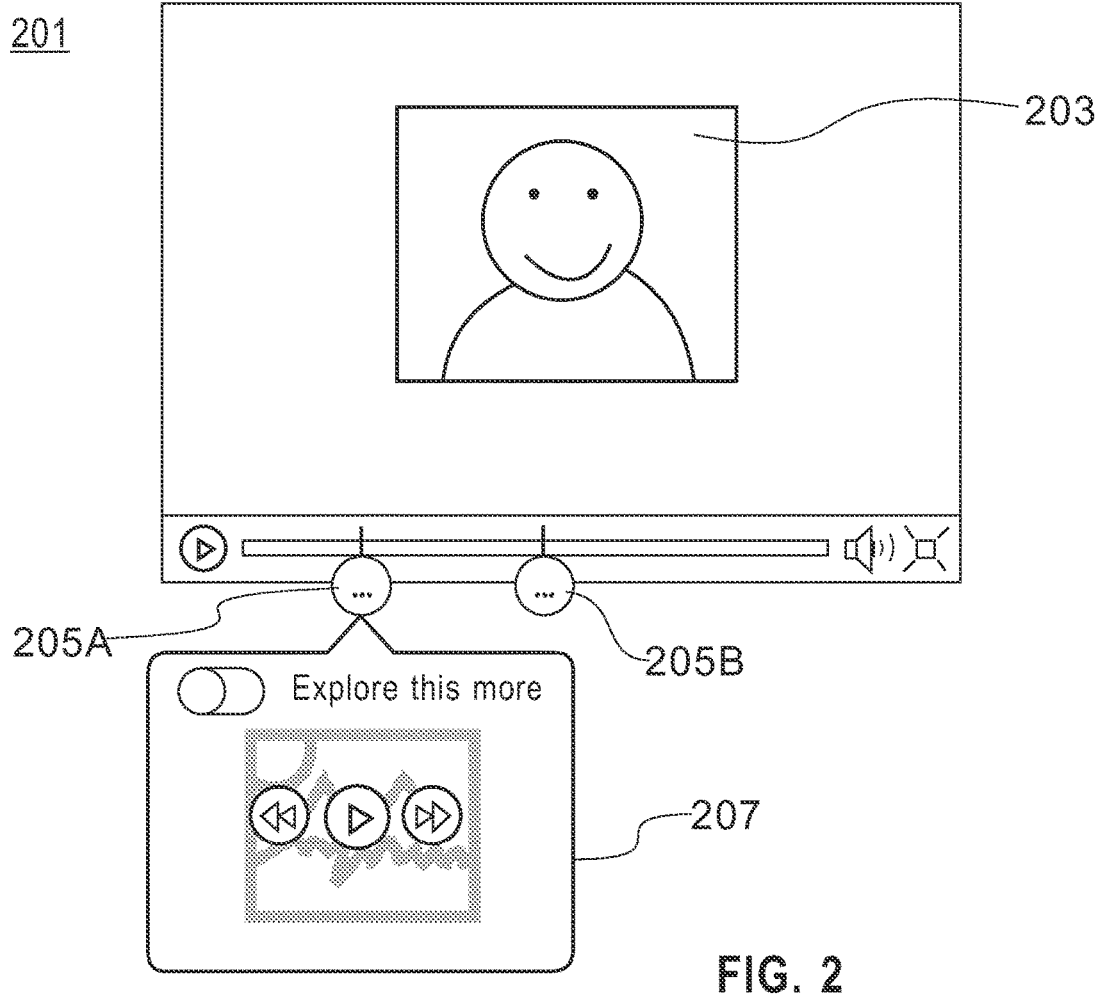
FIG. 2 depicts a diagram showing display of a video presentation according to an embodiment.

In one embodiment, the present disclosure provides for automatically detecting groups of people who may be interested in different types of content (e.g., different presentations, different presentation sections, different presentation styles). Further, the present disclosure provides for automatically proposing such different types of content to a content owner (e.g., presentation creator) as defaults for different presentation filters (in one specific example, the content owner may override the automatically proposed recommendations).

For the purposes of this disclosure the term "presentation" is intended to refer to any computer file providing content therein. In various examples, such a presentation may comprise one or more of: (a) an audio/video presentation; (b) a word processing document; (c) a slide presentation; (d) a spreadsheet; (e) a webpage; (f) a wiki page; (g) a blog; and (h) an electronic book.

Reference will now be made to an example scenario in which the following five steps are performed: Step 1—create user profile groups; Step 2—find defining characteristics of the user profile groups; Step 3—find defining characteristics of content (that had been previously remarked upon) for the user profile groups and embody the defining characteristics of the content in content profiles; Step 4—apply the content profiles to content (which is to be presented) on a section by section basis within a presentation; and Step 5—use the content section profiles to define presentation filters.

Referring now more particularly to Step 1 (create user profile groups), it is noted that in one example, one or more conventional mechanisms for automatically profiling users may be utilized (e.g., one or more conventional mechanisms related to collaborative filtering, affinity analysis and/or personalization).

Further, and still referring to Step 1, in another example, an inspection may be performed (such as may be carried out through semantic analysis) of a user's likes, positive comments and negative comments. Groups of users (which users may be identified by a respective user profile group) may be created where the liking and commenting behavior of any user in the group is more predictive of likes and comments from other users in the group than a random user from the general population of users.

Referring now more particularly to Step 2 (find defining characteristics of the user profile groups), a characteristic is found of members of a given group which is highly predictive (e.g., most highly predictive) of membership in the given group. In one example, this characteristic is then used as a label for the group. For instance, a given group may be titled "Executive", "External", "Summary", "Detailed", "Engineer", "Customers", "Franchise Opening Specialist", "Armonk", "Call Center Employee", "IT Administrator", etc.

Referring now more particularly to Step 3 (find defining characteristics of content (that had been previously remarked upon) for the user profile groups and embody the defining characteristics of the content in content profiles), it is noted that the first part of this step is to find defining characteristics for the content positively described (e.g., through comments and/or likes) by each group. In one example, the second part of this step is to use semantic analysis (and/or other characteristics of the content) to define a content profile that would be predictive of positive descriptions of content by a given group of users. In another example, stylistic choices among the content may be used to define the profile that would be predictive of positive descriptions of content by a given group of users (e.g., for a given presentation, stylistic choices may comprise the number and type of objects on the charts and their relative complexity, such as as measured by number of unique objects within a page, chart or image after raster to vector conversion of embedded images—that is, a page with, for example, many objects and text (such as a complicated flow chart or architecture diagram) might be intended for a more detail-oriented audience, further, the complexity of the content on the page might be determined by a "raster to vector conversion"). In one example, the most predictive characteristic for positive descriptions of content from a given group of users may be sought (not necessarily limited to the positive descriptions of content used to define the group in Step 1).

Referring now more particularly to Step 4 (apply the content profiles to content (which is to be presented) on a section by section basis within a presentation), it is noted that for a particular presentation, for each group identified in Step 1, an analysis is performed for each of the sections of the presentation, comparing each section to the respective content profile developed in Step 3. Further, a score is developed for each section denoting how likely a given group of users is to positively describe that section.

In one specific example, for an audio/video presentation, the presentation may be split into sections based on: (a) stylistic changes in the video; (b) changes to the speaker; (c) if a slide is present (such as a video of someone presenting at a conference), then based on a slide transition; and/or (d) based on scene cuts. In another specific example, a scene transition detection such as described at http://en.wikipedia.org/wiki/Shot_transition_detection may be utilized.

Referring now more particularly to Step 5 (use the content section profiles to define presentation filters), the scores from Step 4 are used to show and hide information from content consumers (e.g., viewers) by ranking presentation sections by score. In various examples, these scores may be used in a number of ways to automatically filter or prioritize display of content and/or to suggest filters, including: (a) optimizing a thumbnail for each group of users by showing a thumbnail of the content most likely to be positively described by a given group; and (b) optimizing the display of the presentation by hiding sections not likely to be positively described by a given group of users.

Still referring to Step 5, in another example, the scores may be used to automatically give recommendations to content creators, editors and/or presenters on how to present the content to different audiences by suggesting a set of sections to present to different groups of users. In one specific example, as seen with reference to FIG. 1, presentation 101 includes sections A-H. The contributor (e.g., writer of the presentation) has no sections marked as to be filtered from view (all sections shown in FIG. 1 with a check mark). In contrast, in this example, the group labeled "Executives" has sections D, G and H marked as to be filtered from view (shown in FIG. 1 with "X" marks). Further, in this example, the group labeled "External" has sections C, D and F-H marked as to be filtered from view (shown in FIG. 1 with "X" marks).

In other examples, one or more of the following may be provided: (a) defining multiple paths through a presentation so the presentation will appear differently to different users when those users view the content; and (b) integrating with a conference presentation tool to give live suggestions for what content to present or to hide based on the audience at the start of a presentation.

In yet another example, a person (e.g., the content owner) may preview the presentation from the perspective of any user or as a profile of users.

Reference will now be made to another embodiment with regard to a "show me more" feature (which may be implemented, for example, via a graphical user interface "GUI" button). In this regard, individual users may request "show me more" or "show me less" which will raise or lower the bar on the score used to calculate which sections of content shown to them. If enough users click "show me more" or "show me less", a new group profile may be automatically split off for these users (and/or for other such users). For example, if users frequently request "show me more" or "show me less" then the original calculation (prediction of content to show) might not be accurate. The calculation would, in this example, then either need to take these requests into account or a new group profile could be created to account for this subset of users. Further, there may be a "show hidden sections" button which shows all the sections of the presentation.

As described herein, various embodiments may apply across a variety of presentation types and different presentation types may have different ways to render hidden sections. For example, FIG. 2 shows an audio/video player 201 in which is played video 203 (which, of course, may include audio). One embodiment provides end user visualization of one or more sections which are being skipped for the user's personalized video experience. In the example of this FIG. 2, there are two areas (205A, 205B) of the video which were removed. The user may see what is being removed from his or her view. The user may hover over the areas and select to "explore this more" (see call out number 207), in which case the section will then play as part of their video and the timeline will adjust to include it. The user may also simply play that section, which is useful especially if the user is returning to an audio/video presentation or has already passed the section. Additional actions may be provided to toggle between personalized profiles (such as switching, for example, to the executive view of the audio/video presentation) or simply showing all the content.

Still referring to FIG. 2, in one example, without further action from the user, the video would play through the three sections (one to the left of 205A, one between 205A and 205B and one to the right of 205B) which are included in the video timeline. The two sections of video (205A and 205B) which were removed from the video through the personalization technique described herein would not be automatically played in this example. Thus, each user potentially has a different collection of video segments played to them automatically. Each user can see where sections have been removed from their playback via associated fly-outs or call-outs on the video timeline. Each user may choose to play hidden sections directly with the video controls in the fly-outs for those sections, or the user may select "explore this more" to enable that section being played in-line with the video as they reach that section. The "explore this more" feature may be automatically disabled or hidden once a user passes a section, or the action may add the video section to the end of the video with a splash screen to introduce the transition.

In another embodiment, spoken words may be transcribed within each identified audio/video segment. The transcribed words may be handled as if they were a text for analysis of relevance and potential interest to a given user.

In another embodiment, the cadence of the speaker and gestures made by the speaker may be examined to compare to the defining characteristics of the content associated with a user's profile group.

In another embodiment, optimization may be provided for cases when an audio/video contains a projected presentation, as is common at conferences. The elements in the projected presentation (including text and graphics) may be treated as if the presentation was being analyzed directly. In one specific example, a user may be enabled to optionally upload a presentation document along with the audio/video to aid in this analysis.

In another specific example, conventional mechanisms in the field of video content analysis (e.g., such as the type described at http://en.wikipedia.org/wiki/Video_content_analysis) may be used to identify objects and compare those objects to the defining characteristics of the content associated with a user's profile group. Further, similar techniques may be applied to audio streams, omitting the content analysis which relies on visual cues.

Once the audio/video sections are identified, content owners may be given the opportunity to label sections of the audio/video to aid a given user in knowing which section(s) to skip.

Figure 3A:
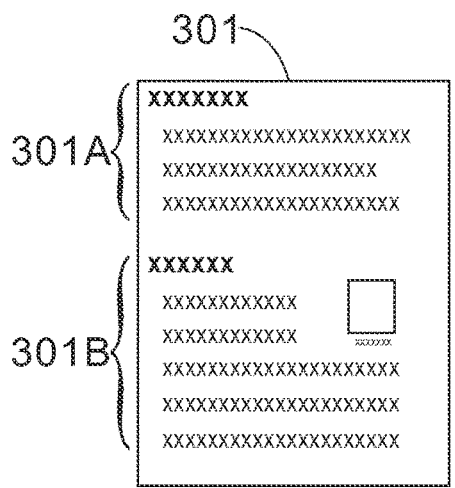
FIGS. 3A and 3B depict diagrams showing display of a word processing document according to an embodiment.
Figure 3B:
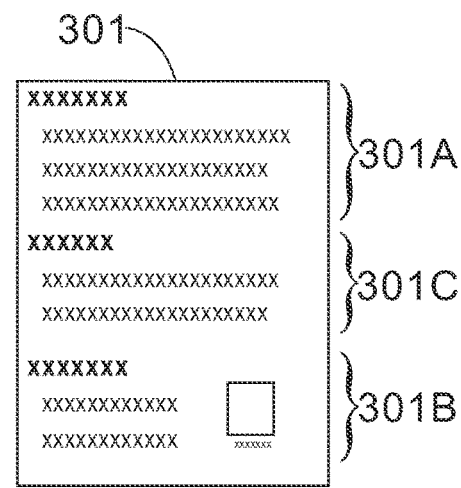

Referring now to FIGS. 3A and 3B, in another example, for a text or office productivity document, a simple collapsible section may be used. More particularly, as seen in FIG. 3A, a document 301 may initially have two sections (301A and 301B) displayed. Then, based upon, for example, a filter applied to a given user (or an explicit request by a given user) document 301 may have a section 301C added for display (see FIG. 3B).

In yet another example, a presentation may be organized such that section(s) which are dependent upon other sections(s) are always shown or hidden together.

Figure 4:
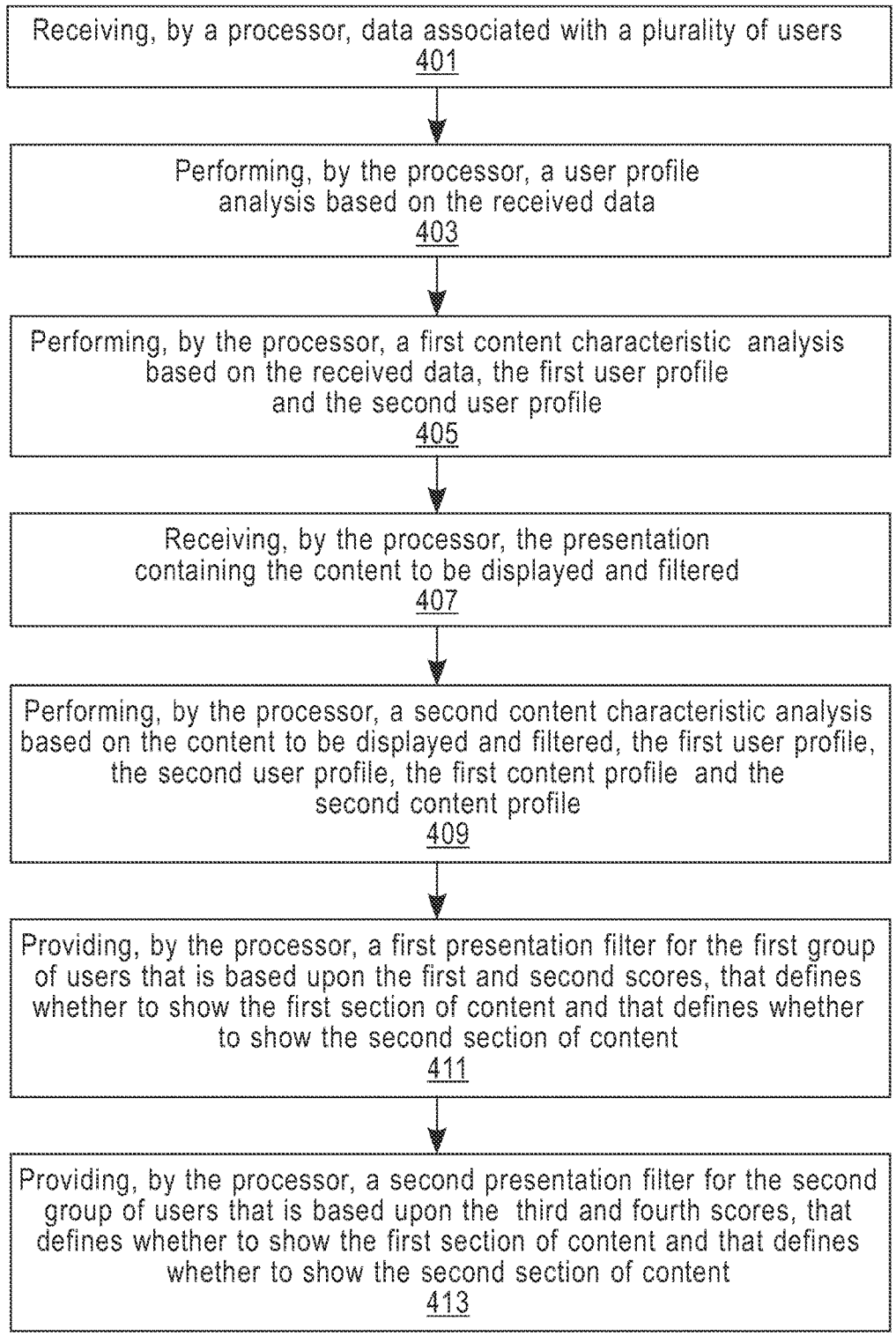
FIG. 4 depicts a flowchart of a method according to an embodiment.

Referring now to FIG. 4, a method for displaying and filtering a content of a presentation is shown. As seen in this FIG. 4, the method of this embodiment comprises: at 401—receiving, by a processor, data associated with a plurality of users, wherein the data comprises: (a) content previously remarked on by the plurality of users; and (b) the remarks previously made by the plurality of users; at 403—performing, by the processor, a user profile analysis based on the received data, wherein the user profile analysis provides: (a) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and (b) a second user profile group identifying a second group of users, wherein the second group of users comprises a subset of the plurality of users and wherein the remarks made by any user in the second group of users is more predictive of remarks from other users in the second group of users than remarks from a random user from the plurality of users; at 405—performing, by the processor, a first content characteristic analysis based on the received data, the first user profile and the second user profile, wherein the first content characteristic analysis provides: (a) for the first user profile a first content profile including at least one characteristic of the content previously remarked on by the plurality of users that would be predictive of positive remarks by the first group of users; and (b) for the second user profile a second content profile including at least one characteristic of the content previously remarked on by the plurality of users that would be predictive of positive remarks by the second group of users; at 407—receiving, by the processor, the presentation containing the content to be displayed and filtered; at 409—performing, by the processor, a second content characteristic analysis based on the content to be displayed and filtered, the first user profile, the second user profile, the first content profile and the second content profile, wherein the second content characteristic analysis provides: (a) for the first user profile, and for a first section of the content to be displayed and filtered, a first score indicative of a likelihood that the first group of users would remark positively on the first section of the content; (b) for the first user profile, and for a second section of the content to be displayed and filtered, a second score indicative of a likelihood that the first group of users would remark positively on the second section of the content; (c) for the second user profile, and for the first section of the content to be displayed and filtered, a third score indicative of a likelihood that the second group of users would remark positively on the first section of the content; and (d) for the second user profile, and for the second section of the content to be displayed and filtered, a fourth score indicative of a likelihood that the second group of users would remark positively on the second section of the content; at 411—providing, by the processor, a first presentation filter for the first group of users that is based upon the first and second scores, that defines whether to show the first section of content and that defines whether to show the second section of content; and at 413—providing, by the processor, a second presentation filter for the second group of users that is based upon the third and fourth scores, that defines whether to show the first section of content and that defines whether to show the second section of content.

Figure 5:
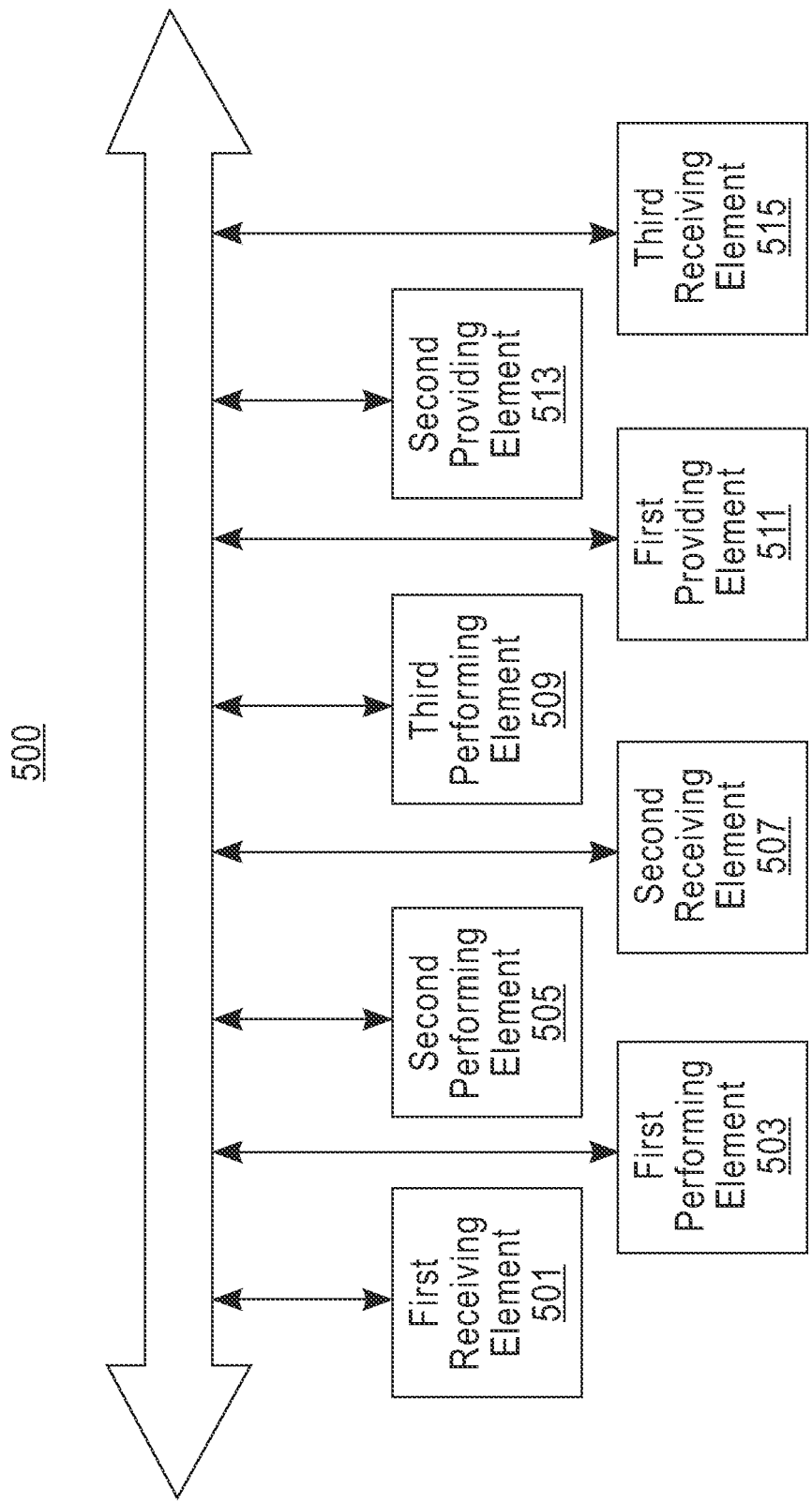
FIG. 5 depicts a block diagram of a system according to an embodiment.

Referring now to FIG. 5, in another embodiment, a system 500 for displaying and filtering a content of a presentation is provided. The system may include a processor (shown) and a memory (not shown) storing computer readable instructions that, when executed by the processor, implement: a first receiving element 501 configured to receive data associated with a plurality of users, wherein the data comprises: (a) content previously remarked on by the plurality of users; and (b) the remarks previously made by the plurality of users; a first performing element 503 configured to perform a user profile analysis based on the received data, wherein the user profile analysis provides: (a) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and (b) a second user profile group identifying a second group of users, wherein the second group of users comprises a subset of the plurality of users and wherein the remarks made by any user in the second group of users is more predictive of remarks from other users in the second group of users than remarks from a random user from the plurality of users; a second performing element 505 configured to perform a first content characteristic analysis based on the received data, the first user profile and the second user profile, wherein the first content characteristic analysis provides: (a) for the first user profile a first content profile including at least one characteristic of the content previously remarked on by the plurality of users that would be predictive of positive remarks by the first group of users; and (b) for the second user profile a second content profile including at least one characteristic of the content previously remarked on by the plurality of users that would be predictive of positive remarks by the second group of users; a second receiving element 507 configured to receive the presentation containing the content to be displayed and filtered; a third performing element 509 configured to perform a second content characteristic analysis based on the content to be displayed and filtered, the first user profile, the second user profile, the first content profile and the second content profile, wherein the second content characteristic analysis provides: (a) for the first user profile, and for a first section of the content to be displayed and filtered, a first score indicative of a likelihood that the first group of users would remark positively on the first section of the content; (b) for the first user profile, and for a second section of the content to be displayed and filtered, a second score indicative of a likelihood that the first group of users would remark positively on the second section of the content; (c) for the second user profile, and for the first section of the content to be displayed and filtered, a third score indicative of a likelihood that the second group of users would remark positively on the first section of the content; and (d) for the second user profile, and for the second section of the content to be displayed and filtered, a fourth score indicative of a likelihood that the second group of users would remark positively on the second section of the content; a first providing element 511 configured to provide a first presentation filter for the first group of users that is based upon the first and second scores, that defines whether to show the first section of content and that defines whether to show the second section of content; and a second providing element 513 configured to provide a second presentation filter for the second group of users that is based upon the third and fourth scores, that defines whether to show the first section of content and that defines whether to show the second section of content.

In addition, the computer readable instructions, when executed by the processor, may further implement a third receiving element 515 (which may be implemented, for example, via a GUI) configured to receive, from a viewer of the presentation, input for dynamically controlling one of: (a) the first presentation filter; and (b) the second presentation filter; wherein varying content is shown to the viewer based upon the received input from the viewer.

In one example, communication between and among the various components of FIG. 5 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 6.

Figure 6:
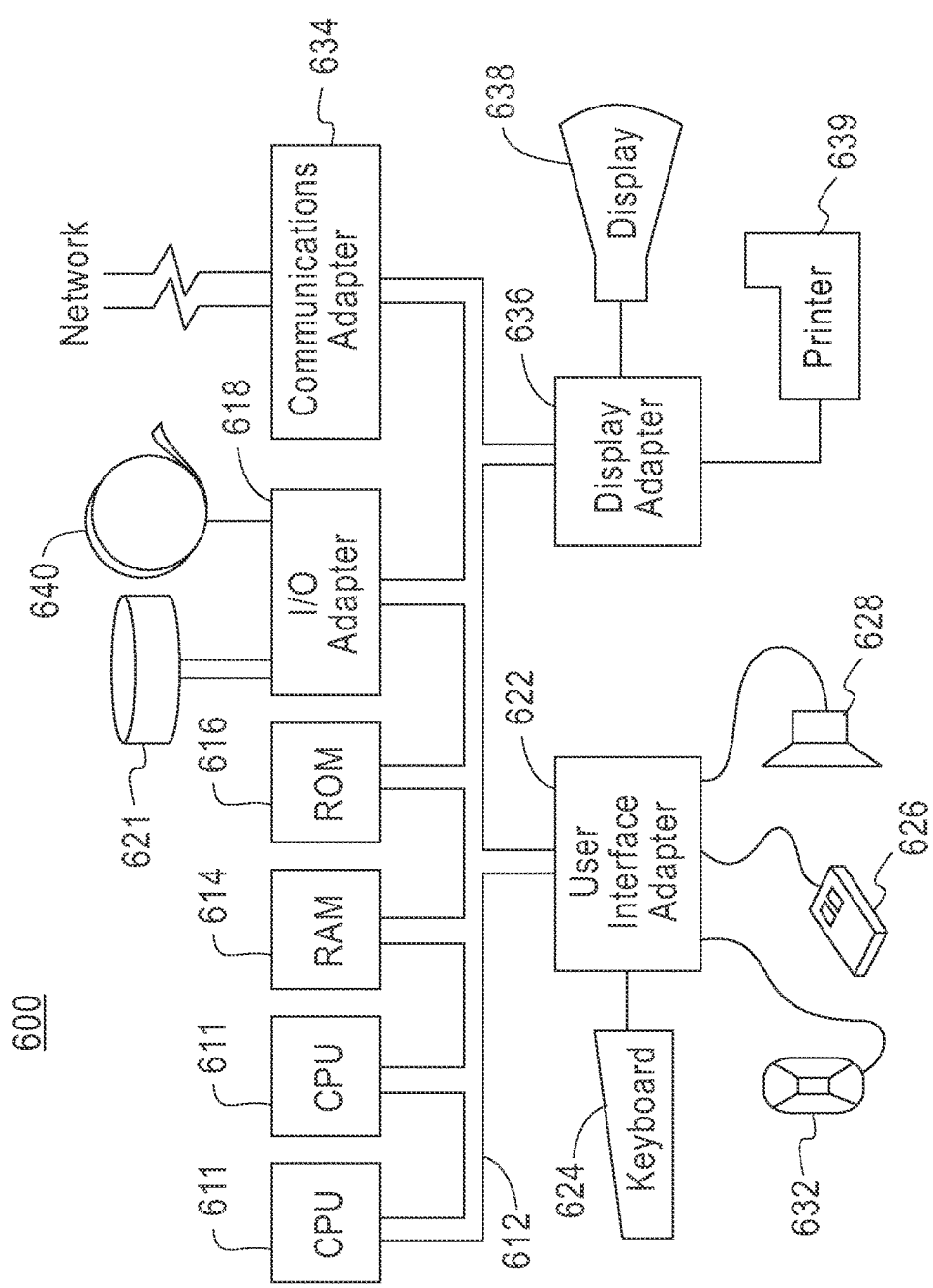
FIG. 6 depicts a block diagram of a system according to an embodiment.

Referring now to FIG. 6, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

As described herein, in various examples, embodiments of the present disclosure do not require comments to be made on the content of the presentation to be displayed and filtered before that content can be profiled and matched to users (this may be useful because much content, especially in an enterprise social network, does not have comments).

As described herein, in various examples, embodiments of the present disclosure provide intelligent and/or predictive mechanisms that operate in a prescribed way to tailor or alter future experiences (e.g., with respect to content in a presentation to be displayed and filtered) based on users' past activities (e.g., prior commenting with respect to content that is other than the content in the presentation to be displayed and filtered).

In one example, sections may be automatically labeled based on an analysis of the words in the section and the words which appear disproportionately in that section compared to the rest of the presentation (e.g., document, audio/video presentation).

In another example, end users may be enabled to suggest (and/or "up and down vote") label(s) for each section.

As described herein, various embodiments may be applied in the context of social software, enterprise social media solutions, collaborative applications software, content applications software, information and data management software and web technology content management and use.

In another example, the present disclosure may be applied in cases when creators/editors may not even know about each other but could be working on presentations derived from the same source.

In another example, the present disclosure may be applied to leverage social profile data, such as network, organization structure, job title, and/or tags. Further, past likes and/or comments may be analyzed to hide or show relevant sections of a presentation to the specific viewer of the presentation.

In another example, the remarks by the users may comprise postings, tags, annotations and/or liking.

In another example, portions/chapters of an electronic book may be exposed or hidden based on the criteria disclosed herein.

In one embodiment, a computer-implemented method for displaying and filtering a content of a presentation is provided, the method comprising: receiving, by a processor, data associated with a plurality of users, wherein the data comprises: (a) content previously remarked on by the plurality of users; and (b) the remarks previously made by the plurality of users; performing, by the processor, a user profile analysis based on the received data, wherein the user profile analysis provides: (a) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and (b) a second user profile group identifying a second group of users, wherein the second group of users comprises a subset of the plurality of users and wherein the remarks made by any user in the second group of users is more predictive of remarks from other users in the second group of users than remarks from a random user from the plurality of users; performing, by the processor, a first content characteristic analysis based on the received data, the first user profile and the second user profile, wherein the first content characteristic analysis provides: (a) for the first user profile a first content profile including at least one characteristic of the content previously remarked on by the plurality of users that would be predictive of positive remarks by the first group of users; and (b) for the second user profile a second content profile including at least one characteristic of the content previously remarked on by the plurality of users that would be predictive of positive remarks by the second group of users; receiving, by the processor, the presentation containing the content to be displayed and filtered; performing, by the processor, a second content characteristic analysis based on the content to be displayed and filtered, the first user profile, the second user profile, the first content profile and the second content profile, wherein the second content characteristic analysis provides: (a) for the first user profile, and for a first section of the content to be displayed and filtered, a first score indicative of a likelihood that the first group of users would remark positively on the first section of the content; (b) for the first user profile, and for a second section of the content to be displayed and filtered, a second score indicative of a likelihood that the first group of users would remark positively on the second section of the content; (c) for the second user profile, and for the first section of the content to be displayed and filtered, a third score indicative of a likelihood that the second group of users would remark positively on the first section of the content; and (d) for the second user profile, and for the second section of the content to be displayed and filtered, a fourth score indicative of a likelihood that the second group of users would remark positively on the second section of the content; providing, by the processor, a first presentation filter for the first group of users that is based upon the first and second scores, that defines whether to show the first section of content and that defines whether to show the second section of content; and providing, by the processor, a second presentation filter for the second group of users that is based upon the third and fourth scores, that defines whether to show the first section of content and that defines whether to show the second section of content.

In one example, the remarks previously made by the plurality of users comprise: (a) likes; (b) positive comments; and (c) negative comments.

In another example, the first group of users and the second group of users are mutually exclusive.

In another example, at least one user in the first group of users is not in the second group of users and at least one user in the second group of users is not in the first group of users.

In another example, the presentation comprises one of: (a) an audio/video presentation; (b) a word processing document; (c) a slide presentation; (d) a spreadsheet; (e) a webpage; (f) a wiki page and (g) a blog.

In another example, each of the first section and the second section comprises one of: (a) a scene in an audio/video presentation; (b) a frame in an audio/video presentation; (c) a slide of a slide presentation; (d) an image of a slide presentation; (e) a portion of text of a slide presentation; (f) a page of a word processing document; (g) a paragraph of a word processing document; and (h) an image of a word processing document.

In another example, the method further comprises: receiving by the processor, from a viewer of the presentation, input for dynamically controlling one of: (a) the first presentation filter; and (b) the second presentation filter; wherein varying content is shown to the viewer based upon the received input from the viewer.

In another embodiment, a computer readable storage medium, tangibly embodying a program of instructions executable by the computer for displaying and filtering a content of a presentation is provided, the program of instructions, when executing, performing the following steps: receiving data associated with a plurality of users, wherein the data comprises: (a) content previously remarked on by the plurality of users; and (b) the remarks previously made by the plurality of users; performing a user profile analysis based on the received data, wherein the user profile analysis provides: (a) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and (b) a second user profile group identifying a second group of users, wherein the second group of users comprises a subset of the plurality of users and wherein the remarks made by any user in the second group of users is more predictive of remarks from other users in the second group of users than remarks from a random user from the plurality of users; performing a first content characteristic analysis based on the received data, the first user profile and the second user profile, wherein the first content characteristic analysis provides: (a) for the first user profile a first content profile including at least one characteristic of the content previously remarked on by the plurality of users that would be predictive of positive remarks by the first group of users; and (b) for the second user profile a second content profile including at least one characteristic of the content previously remarked on by the plurality of users that would be predictive of positive remarks by the second group of users; receiving the presentation containing the content to be displayed and filtered; performing a second content characteristic analysis based on the content to be displayed and filtered, the first user profile, the second user profile, the first content profile and the second content profile, wherein the second content characteristic analysis provides: (a) for the first user profile, and for a first section of the content to be displayed and filtered, a first score indicative of a likelihood that the first group of users would remark positively on the first section of the content; (b) for the first user profile, and for a second section of the content to be displayed and filtered, a second score indicative of a likelihood that the first group of users would remark positively on the second section of the content; (c) for the second user profile, and for the first section of the content to be displayed and filtered, a third score indicative of a likelihood that the second group of users would remark positively on the first section of the content; and (d) for the second user profile, and for the second section of the content to be displayed and filtered, a fourth score indicative of a likelihood that the second group of users would remark positively on the second section of the content; providing a first presentation filter for the first group of users that is based upon the first and second scores, that defines whether to show the first section of content and that defines whether to show the second section of content; and providing a second presentation filter for the second group of users that is based upon the third and fourth scores, that defines whether to show the first section of content and that defines whether to show the second section of content.

In one example, the remarks previously made by the plurality of users comprise: (a) likes; (b) positive comments; and (c) negative comments.

In another example, the first group of users and the second group of users are mutually exclusive.

In another example, at least one user in the first group of users is not in the second group of users and at least one user in the second group of users is not in the first group of users.

In another example, the presentation comprises one of: (a) an audio/video presentation; (b) a word processing document; (c) a slide presentation; (d) a spreadsheet; (e) a webpage; (f) a wiki page and (g) a blog.

In another example, each of the first section and the second section comprises one of: (a) a scene in an audio/video presentation; (b) a frame in an audio/video presentation; (c) a slide of a slide presentation; (d) an image of a slide presentation; (e) a portion of text of a slide presentation; (f) a page of a word processing document; (g) a paragraph of a word processing document; and (h) an image of a word processing document.

In another example, the program of instructions, when executing, further performs: receiving, from a viewer of the presentation, input for dynamically controlling one of: (a) the first presentation filter; and (b) the second presentation filter; wherein varying content is shown to the viewer based upon the received input from the viewer.

In another embodiment, a computer-implemented system for displaying and filtering a content of a presentation is provided, the system comprising: a processor; and a memory storing computer readable instructions that, when executed by the processor, implement: a first receiving element configured to receive data associated with a plurality of users, wherein the data comprises: (a) content previously remarked on by the plurality of users; and (b) the remarks previously made by the plurality of users; a first performing element configured to perform a user profile analysis based on the received data, wherein the user profile analysis provides: (a) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and (b) a second user profile group identifying a second group of users, wherein the second group of users comprises a subset of the plurality of users and wherein the remarks made by any user in the second group of users is more predictive of remarks from other users in the second group of users than remarks from a random user from the plurality of users; a second performing element configured to perform a first content characteristic analysis based on the received data, the first user profile and the second user profile, wherein the first content characteristic analysis provides: (a) for the first user profile a first content profile including at least one characteristic of the content previously remarked on by the plurality of users that would be predictive of positive remarks by the first group of users; and (b) for the second user profile a second content profile including at least one characteristic of the content previously remarked on by the plurality of users that would be predictive of positive remarks by the second group of users; a second receiving element configured to receive the presentation containing the content to be displayed and filtered; a third performing element configured to perform a second content characteristic analysis based on the content to be displayed and filtered, the first user profile, the second user profile, the first content profile and the second content profile, wherein the second content characteristic analysis provides: (a) for the first user profile, and for a first section of the content to be displayed and filtered, a first score indicative of a likelihood that the first group of users would remark positively on the first section of the content; (b) for the first user profile, and for a second section of the content to be displayed and filtered, a second score indicative of a likelihood that the first group of users would remark positively on the second section of the content; (c) for the second user profile, and for the first section of the content to be displayed and filtered, a third score indicative of a likelihood that the second group of users would remark positively on the first section of the content; and (d) for the second user profile, and for the second section of the content to be displayed and filtered, a fourth score indicative of a likelihood that the second group of users would remark positively on the second section of the content; a first providing element configured to provide a first presentation filter for the first group of users that is based upon the first and second scores, that defines whether to show the first section of content and that defines whether to show the second section of content; and a second providing element configured to provide a second presentation filter for the second group of users that is based upon the third and fourth scores, that defines whether to show the first section of content and that defines whether to show the second section of content.

In one example, the remarks previously made by the plurality of users comprise: (a) likes; (b) positive comments; and (c) negative comments.

In another example, the first group of users and the second group of users are mutually exclusive.

In another example, the presentation comprises one of: (a) an audio/video presentation; (b) a word processing document; (c) a slide presentation; (d) a spreadsheet; (e) a webpage; (f) a wiki page and (g) a blog.

In another example, each of the first section and the second section comprises one of: (a) a scene in an audio/video presentation; (b) a frame in an audio/video presentation; (c) a slide of a slide presentation; (d) an image of a slide presentation; (e) a portion of text of a slide presentation; (f) a page of a word processing document; (g) a paragraph of a word processing document; and (h) an image of a word processing document.

In another example, the computer readable instructions, when executed by the processor, further implement: a third receiving element configured to receive, from a viewer of the presentation, input for dynamically controlling one of: (a) the first presentation filter; and (b) the second presentation filter; wherein varying content is shown to the viewer based upon the received input from the viewer.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for displaying and filtering a content of a presentation; the method comprising:
   receiving, by a processor, data associated with a plurality of users, wherein the data comprises;
   (a) content previously remarked on by the plurality of users; and
   (b) the remarks previously made by the plurality of users;
   performing, by the processor, a user profile analysis based on the received data, wherein the user profile analysis provides:
   (c) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and
   (d) a second user profile group identifying a second group of users, wherein the second group of users comprises a subset of the plurality of users and wherein the remarks made by any user in the second group of users is more predictive of remarks from other users in the second group of users than remarks from a random user from the plurality of users;
   performing, by the processor, a first content characteristic analysis based on the received data, the first user profile group and the second user profile group, wherein the first content characteristic analysis provides:
   (e) for the first user profile group a first content profile including at least one characteristic of the content previously remarked on by the plurality of users that is predictive of positive remarks by the first group of users; and
   (f) for the second user profile group a second content profile including at least one characteristic of the content previously remarked on by the plurality of users that is predictive of positive remarks by the second group of users;
   receiving, by the processor, the presentation containing the content;
   performing, by the processor, a second content characteristic analysis based on the content, the first user profile group, the second user profile group, the first content profile and the second content profile, wherein the second content characteristic analysis provides:
   (g) for the first user profile group, and for a first section of the content, a first score indicative of a likelihood that the first group of users remarks positively on the first section of the content;
   (h) for the first user profile group, and for a second section of the content, a second score indicative of a likelihood that the first group of users remarks positively on the second section of the content;
   (i) for the second user profile group, and for the first section of the content, a third score indicative of a likelihood that the second group of users remarks positively on the first section of the content; and
   (j) for the second user profile group, and for the second section of the content, a fourth score indicative of a likelihood that the second group of users remarks positively on the second section of the content;
   providing, by the processor, a first presentation filter for the first group of users that is based upon the first and second scores, that defines whether to show the first section of content and that defines whether to show the second section of content; and
   providing, by the processor, a second presentation filter for the second group of users that is based upon the third and fourth scores, that defines whether to show the first section of content and that defines whether to show the second section of content;
   wherein the providing the first presentation filter comprises at least causing a video player to play the content while skipping one of the first section and the second section based on the first presentation filter automatically, and causing the video player to display a call-out on a timeline of the content automatically, the call-out on the timeline comprising a video control that controls playing of the skipped section.

2. The method of claim 1, wherein the remarks previously made by the plurality of users comprise: (a) likes; (b) positive comments; and (c) negative comments.

3. The method of claim 1, wherein the first group of users and the second group of users are mutually exclusive.

4. The method of claim 1, wherein at least one user in the first group of users is not in the second group of users and at least one user in the second group of users is not in the first group of users.

5. The method of claim 1, wherein the presentation comprises one of: (a) an audio/video presentation; (b) a word processing document; (c) a slide presentation; (d) a spreadsheet; (e) a webpage; (f) a wiki page and (g) a blog.

6. The method of claim 1, wherein each of the first section and the second section comprises one of: (a) a scene in an audio/video presentation; (b) a frame in an audio/video presentation; (c) a slide of a slide presentation; (d) an image of a slide presentation; (e) a portion of text of a slide presentation; (f) a page of a word processing document; (g) a paragraph of a word processing document; and (h) an image of a word processing document.

7. The method of claim 1, further comprising:
receiving by the processor, from a viewer of the presentation, input for dynamically controlling one of: (a) the first presentation filter; and (b) the second presentation filter;
wherein varying content is shown to the viewer based upon the received input from the viewer.

8. A computer readable storage medium, tangibly embodying a program of instructions executable by the computer for displaying and filtering a content of a presentation, the program of instructions, when executing, performing the following steps:
receiving data associated with a plurality of users, wherein the data comprises:
(a) content previously remarked on by the plurality of users; and
(b) the remarks previously made by the plurality of users; performing a user profile analysis based on the received data, wherein the user profile analysis provides:
(c) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and
(d) a second user profile group identifying a second group of users, wherein the second group of users comprises a subset of the plurality of users and wherein the remarks made by any user in the second group of users is more predictive of remarks from other users in the second group of users than remarks from a random user from the plurality of users;
performing a first content characteristic analysis based on the received data, the first user profile group and the second user profile group, wherein the first content characteristic analysis provides:
(e) for the first user profile group a first content profile including at least one characteristic of the content previously remarked on by the plurality of users that is predictive of positive remarks by the first group of users; and
(f) for the second user profile group a second content profile including at least one characteristic of the content previously remarked on by the plurality of users that is predictive of positive remarks by the second group of users;
receiving the presentation containing the content;
performing a second content characteristic analysis based on the content, the first user profile group, the second user profile group, the first content profile and the second content profile, wherein the second content characteristic analysis provides:
(g) for the first user profile group, and for a first section of the content, a first score indicative of a likelihood that the first group of users remarks positively on the first section of the content;
(h) for the first user profile group, and for a second section of the content, a second score indicative of a likelihood that the first group of users remarks positively on the second section of the content;
(l) for the second user profile group, and for the first section of the content, a third score indicative of a likelihood that the second group of users remarks positively on the first section of the content; and
(j) for the second user profile group, and for the second section of the content, a fourth score indicative of a likelihood that the second group of users remarks positively on the second section of the content;
providing a first presentation filter for the first group of users that is based upon the first and second scores, that defines whether to show the first section of content and that defines whether to show the second section of content; and
providing a second presentation filter for the second group of users that is based upon the third and fourth scores, that defines whether to show the first section of content and that defines whether to show the second section of content,
wherein the providing the first presentation comprises at least causing a video player to play the content while skipping one of the first section and the second section based on the first presentation filter automatically, and causing the video player to display a call-out on a timeline of the content automatically, the call-out on the timeline comprising a video control that controls playing of the skipped section.

9. The computer readable storage medium of claim 8, wherein the remarks previously made by the plurality of users comprise: (a) likes; (b) positive comments; and (c) negative comments.

10. The computer readable storage medium of claim 8, wherein the first group of users and the second group of users are mutually exclusive.

11. The computer readable storage medium of claim 8, wherein at least one user in the first group of users is not in the second group of users and at least one user in the second group of users is not in the first group of users.

12. The computer readable storage medium of claim 8, wherein the presentation comprises one of: (a) an audio/video presentation; (b) a word processing document; (c) a slide presentation; (d) a spreadsheet; (e) a webpage; (f) a wiki page and (g) a blog.

13. The computer readable storage medium of claim 8, wherein each of the first section and the second section comprises one of: (a) a scene in an audio/video presentation; (b) a frame in an audio/video presentation; (c) a slide of a slide presentation; (d) an image of a slide presentation; (e) a portion of text of a slide presentation; (f) a page of a word processing document; (g) a paragraph of a word processing document; and (h) an image of a word processing document.

14. The computer readable storage medium of claim 8, wherein the program of instructions, when executing, further performs:
receiving, from a viewer of the presentation, input for dynamically controlling one of: (a) the first presentation filter; and (b) the second presentation filter;
wherein varying content is shown to the viewer based upon the received input from the viewer.

15. A computer-implemented system for displaying and filtering a content of a presentation, the system comprising:
a processor; and
a memory storing computer readable instructions that, when executed by the processor, implement:

a first receiving element configured to receive data associated with a plurality of users, wherein the data comprises:
(a) content previously remarked on by the plurality of users; and
(b) the remarks previously made by the plurality of users;
a first performing element configured to perform a user profile analysis based on the received data, wherein the user profile analysis provides:
(c) a first user profile group identifying a first group of users, wherein the first group of users comprises a subset of the plurality of users and wherein the remarks made by any user in the first group of users is more predictive of remarks from other users in the first group of users than remarks from a random user from the plurality of users; and
(d) a second user profile group identifying a second group of users, wherein the second group of users comprises a subset of the plurality of users and wherein the remarks made by any user in the second group of users is more predictive of remarks from other users in the second group of users than remarks from a random user from the plurality of users;
a second performing element configured to perform a first content characteristic analysis based on the received data, the first user profile group and the second user group, wherein the first content characteristic analysis provides:
(a) for the first user profile group a first content profile including at least one characteristic of the content previously remarked on by the plurality of users that is predictive of positive remarks by the first group of users; and
(f) for the second user profile group a second content profile including at least one characteristic of the content previously remarked on by the plurality of users that is predictive of positive remarks by the second group of users;
a second receiving element configured to receive the presentation containing the content;
a third performing element configured to perform a second content characteristic analysis based on the content; the first user profile group, the second user profile group, the first content profile and the second content profile, wherein the second content characteristic analysis provides:
(g) for the first user profile group, and for a first section of the content, a first score indicative of a likelihood that the first group of users remarks positively on the first section of the content;
(h) for the first user profile group, and for a second section of the content, a second score indicative of a likelihood that the first group of users remarks positively on the second section of the content;
(i) for the second user profile group, and for the first section of the content, a third score indicative of a likelihood that the second group of users remarks positively on the first section of the content; and
(j) for the second user profile group, and for the second section of the content, a fourth score indicative of a likelihood that the second group of users remarks positively on the second section of the content;
a first providing element configured to provide a first presentation filter for the first group of users that is based upon the first and second scores, that defines whether to show the first section of content and that defines whether to show the second section of content; and
a second providing element configured to provide a second presentation filter for the second group of users that is based upon the third and fourth scores; that defines whether to show the first section of content and that defines whether to show the second section of content,
wherein the providing the first presentation filter comprises at least causing a video player to play the content while slopping one of the first section and the second section based on the first presentation filter automatically; and causing the video player to display a call-out on a timeline of the content automatically, the call-out on the timeline comprising a video control that controls playing of the skipped section.

16. The system of claim 15, wherein the remarks previously made by the plurality of users comprise: (a) likes; (b) positive comments; and (c) negative comments.

17. The system of claim 15, wherein the first group of users and the second group of users are mutually exclusive.

18. The system of claim 15, wherein the presentation comprises one of: (a) an audio/video presentation; (b) a word processing document; (c) a slide presentation; (d) a spreadsheet; (e) a webpage; (f) a wiki page and (g) a blog.

19. The system of claim 15, wherein each of the first section and the second section comprises one of: (a) a scene in an audio/video presentation; (b) a frame in an audio/video presentation; (c) a slide of a slide presentation; (d) an image of a slide presentation; (e) a portion of text of a slide presentation; (f) a page of a word processing document; (g) a paragraph of a word processing document; and (h) an image of a word processing document.

20. The system of claim 15, wherein the computer readable instructions, when executed by the processor, further implement:
a third receiving element configured to receive, from a viewer of the presentation, input for dynamically controlling one of: (a) the first presentation filter; and (b) the second presentation filter;
wherein varying content is shown to the viewer based upon the received input from the viewer.

* * * * *